United States Patent [19]

Takahashi et al.

[11] Patent Number: 5,231,582
[45] Date of Patent: Jul. 27, 1993

[54] SHIFTING CONTROL SYSTEM FOR AUTOMOTIVE AUTOMATIC POWER TRANSMISSION WITH ENHANCED VARIABLE SHIFT PATTERN SELECTION DEPENDING UPON A RESISTANCE BASED UPON VEHICLE ACCELERATION AND AN ENGINE PARAMETER

[75] Inventors: Hiroshi Takahashi; Yasushi Narita; Makoto Kimura; Toshimi Abo, all of Kanagawa, Japan

[73] Assignee: Nissan Motor Company, Yokohama, Japan

[21] Appl. No.: 938,681

[22] Filed: Sep. 1, 1992

Related U.S. Application Data

[63] Continuation of Ser. No. 863,314, Apr. 1, 1992, abandoned, which is a continuation of Ser. No. 499,584, Mar. 27, 1990, abandoned.

[30] Foreign Application Priority Data

| Mar. 29, 1989 | [JP] | Japan | 1-79376 |
| Mar. 31, 1989 | [JP] | Japan | 1-82210 |
| Apr. 4, 1989 | [JP] | Japan | 1-86620 |
| Apr. 12, 1989 | [JP] | Japan | 1-93829 |
| Apr. 26, 1989 | [JP] | Japan | 1-106893 |
| May 10, 1989 | [JP] | Japan | 1-117865 |
| May 11, 1989 | [JP] | Japan | 1-118048 |
| May 11, 1989 | [JP] | Japan | 1-118049 |

[51] Int. Cl.$^5$ .............................................. B60K 41/00
[52] U.S. Cl. .......................... 364/424.1; 364/426.01; 74/866
[58] Field of Search .......... 74/866; 364/424.1, 426.04, 364/575, 431.01, 431.03, 431.04; 180/197, 169, 170

[56] References Cited

U.S. PATENT DOCUMENTS

| 4,194,608 | 3/1980 | Usui et al. | 192/0.092 |
| 4,338,666 | 7/1982 | Suzuki et al. | 364/424.1 |
| 4,523,281 | 6/1985 | Noda et al. | 364/424.1 |
| 4,621,705 | 11/1986 | Etoh | 364/426.04 X |
| 4,622,636 | 11/1986 | Tachibana | 364/426.04 |
| 4,703,429 | 10/1987 | Sakata | 364/426.04 |
| 4,819,163 | 4/1989 | Shimizu et al. | 364/424.1 |
| 4,829,438 | 5/1989 | Etoh | 364/426.04 |
| 4,833,612 | 5/1989 | Okuno et al. | 364/426.04 |
| 4,841,815 | 6/1989 | Takahashi | 74/866 |
| 4,897,790 | 1/1990 | Bieber | 364/424.1 |
| 4,913,006 | 4/1990 | Tsuyama et al. | 74/866 |
| 4,933,859 | 6/1990 | Tsuyama et al. | 364/426.04 |
| 4,938,101 | 7/1990 | Maki et al. | 74/866 |
| 4,939,657 | 7/1990 | Imai et al. | 364/426.04 |
| 4,941,096 | 7/1990 | Ito et al. | 364/424.1 |
| 4,943,920 | 7/1990 | Hiramatsu et al. | 364/424.1 |
| 4,943,921 | 7/1990 | Baltusis et al. | 364/424.1 |
| 4,947,329 | 8/1990 | Benford et al. | 364/424.1 |
| 4,953,093 | 8/1990 | Etoh | 364/424.04 |
| 5,012,418 | 4/1991 | Petzold | 364/426.04 |
| 5,035,160 | 7/1991 | Morita | 364/424.1 X |
| 5,036,730 | 8/1991 | Sakai et al. | 364/424.1 X |
| 5,038,880 | 8/1991 | Matsuoka et al. | 364/426.04 X |

FOREIGN PATENT DOCUMENTS

| 4006451 | 9/1990 | Fed. Rep. of Germany . |
| 62-165052 | 7/1987 | Japan . |
| 62-180153 | 8/1987 | Japan . |
| 63-167161 | 7/1988 | Japan . |

Primary Examiner—Parshotam S. Lall
Assistant Examiner—Thomas S. Auchterlonie
Attorney, Agent, or Firm—Foley & Lardner

[57] ABSTRACT

A shift control system detects a traveling resistance as a factor influencing the vehicular driving performance. The shift control system varies preset shift pattern according to the detected traveling resistance of the vehicle for optimizing selection of the shift pattern. The shift control system thus controls the speed ratio of an automatic power transmission depending upon the control parameters, such as an engine load and a vehicle acceleration.

8 Claims, 18 Drawing Sheets

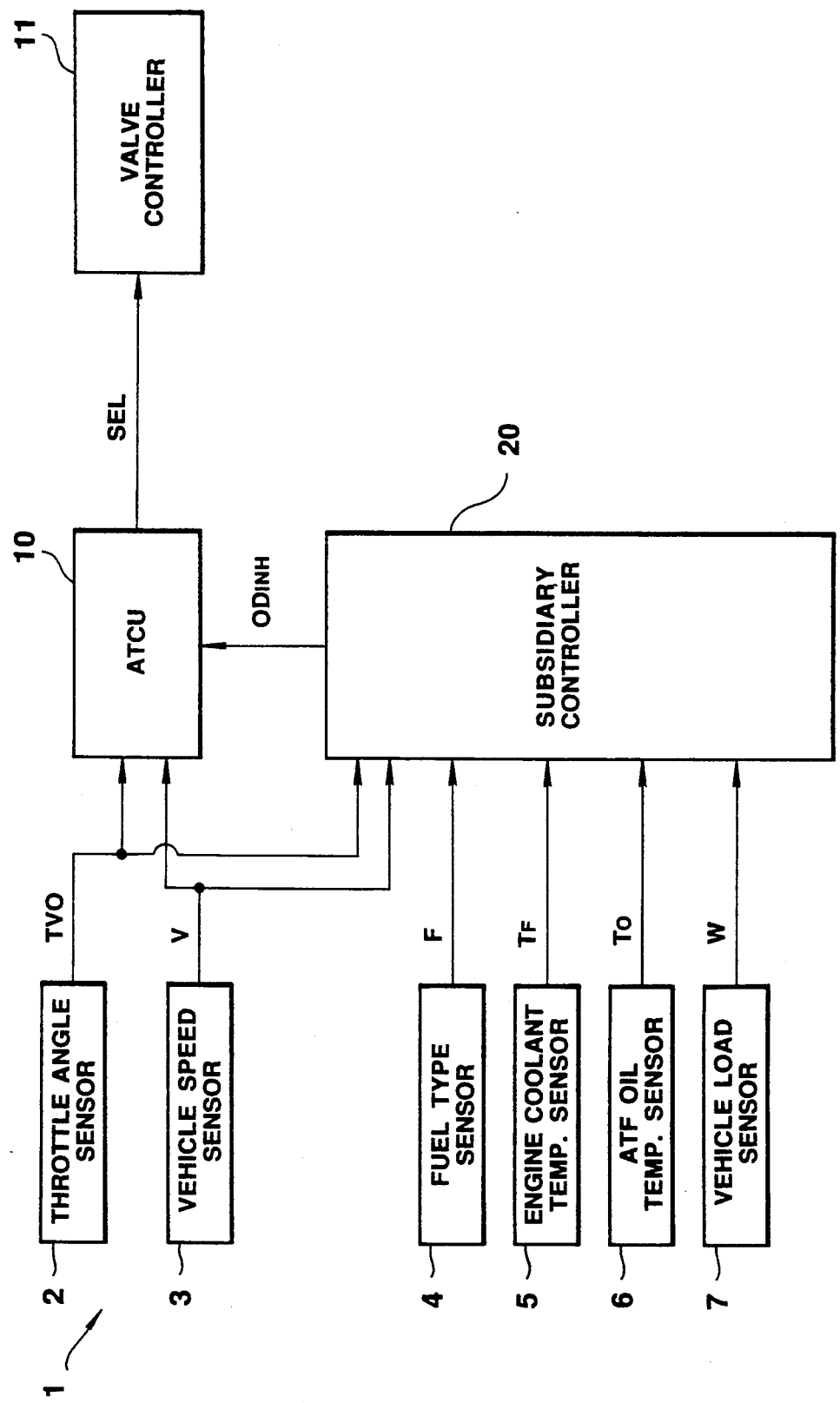

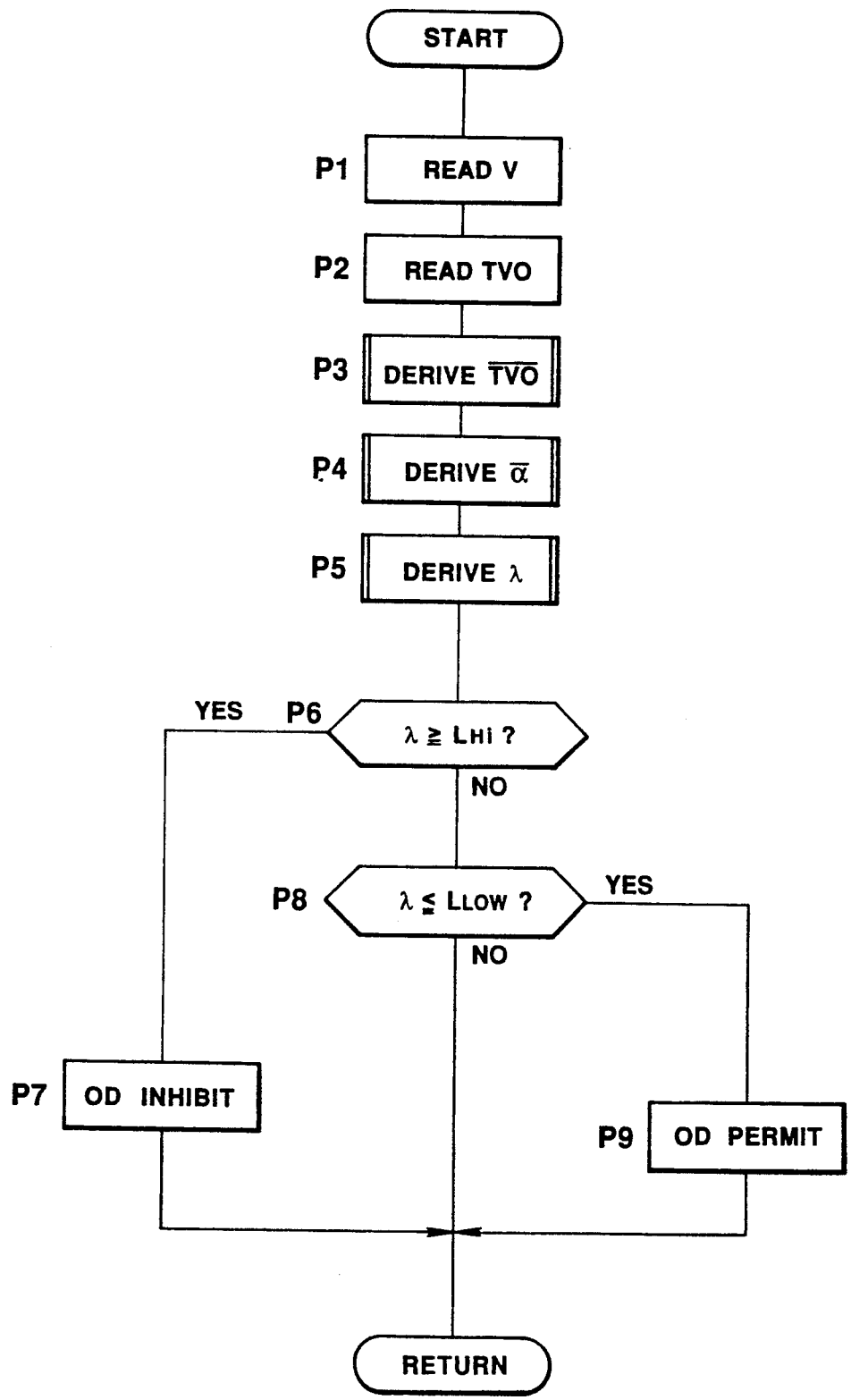

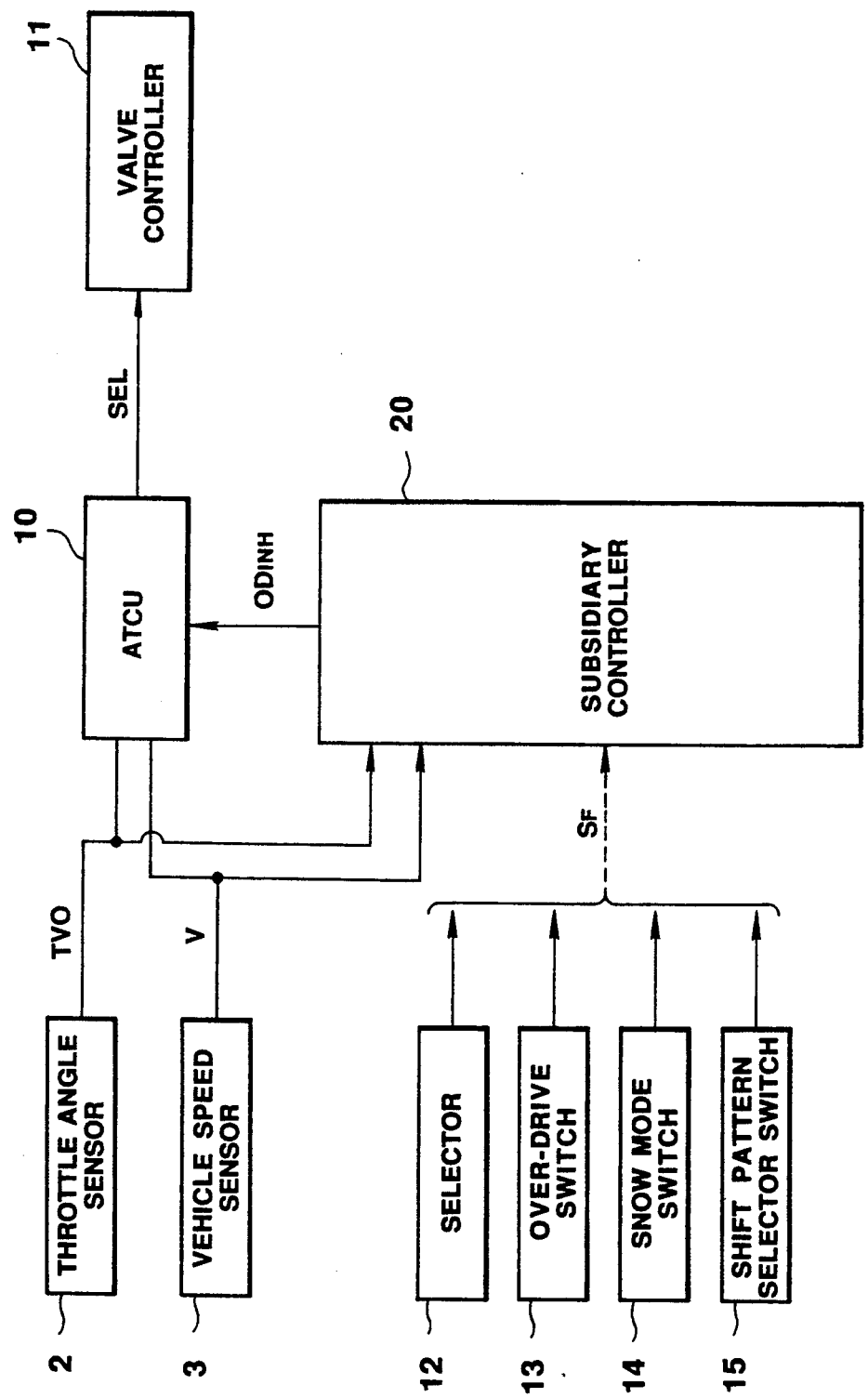

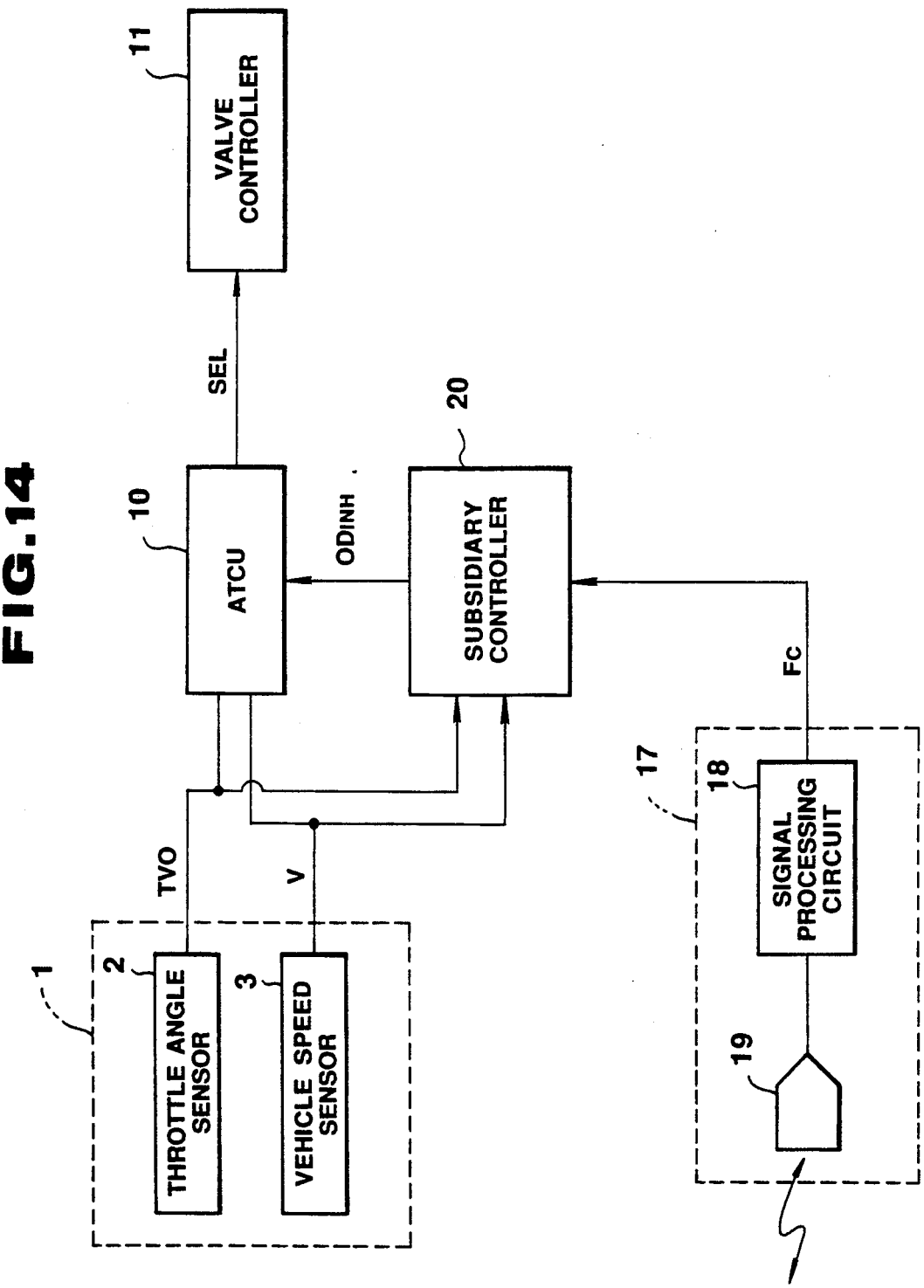

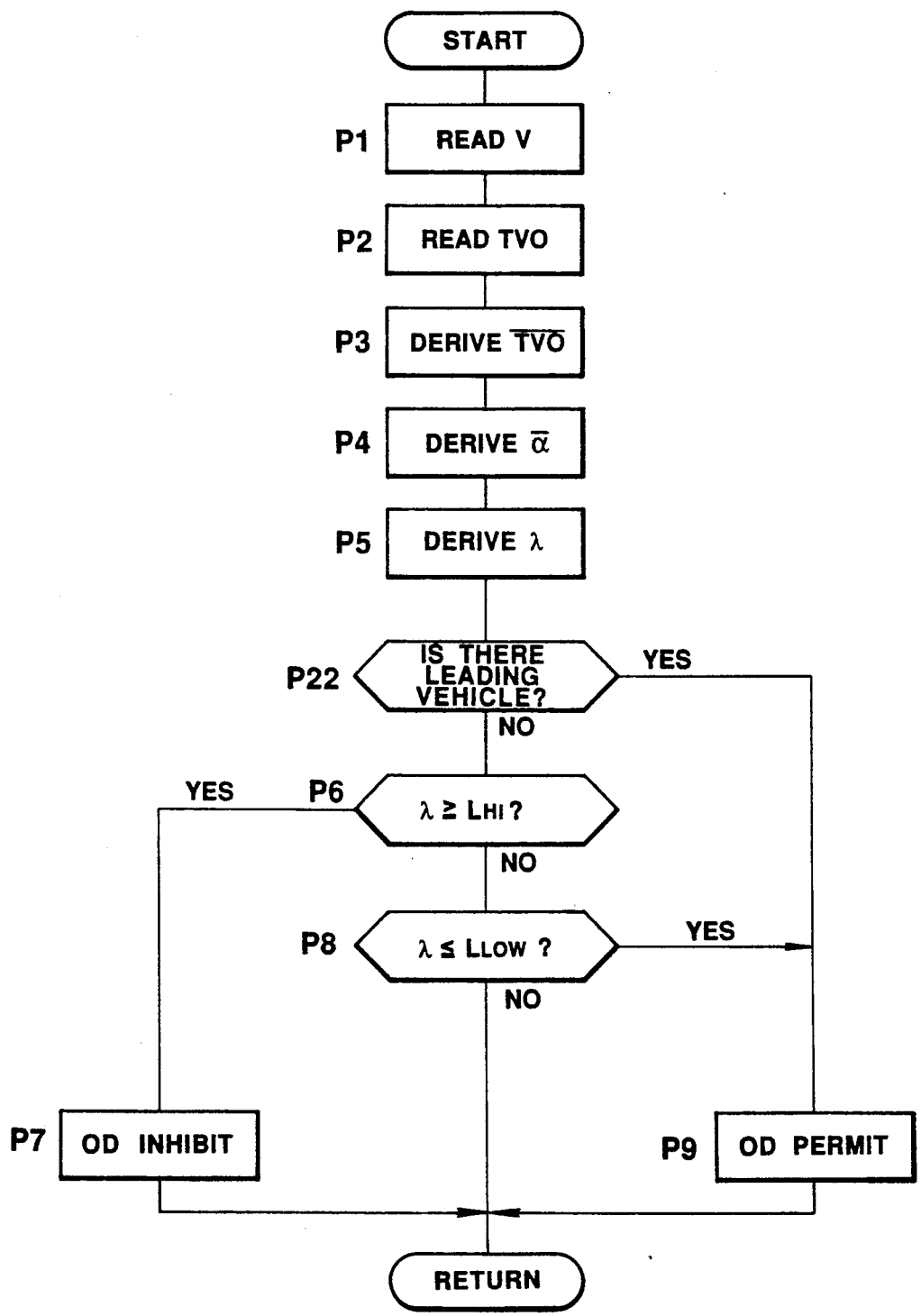

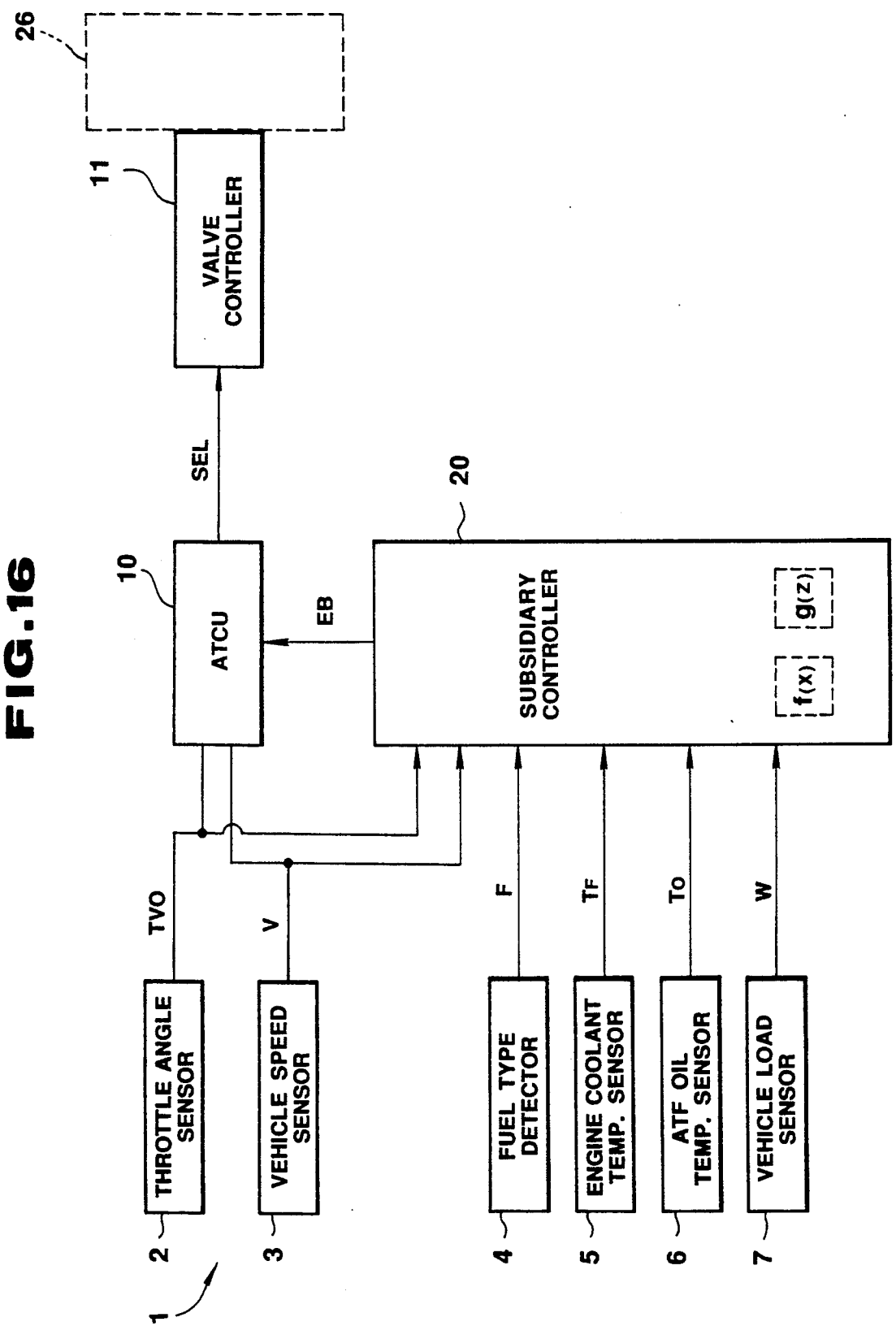

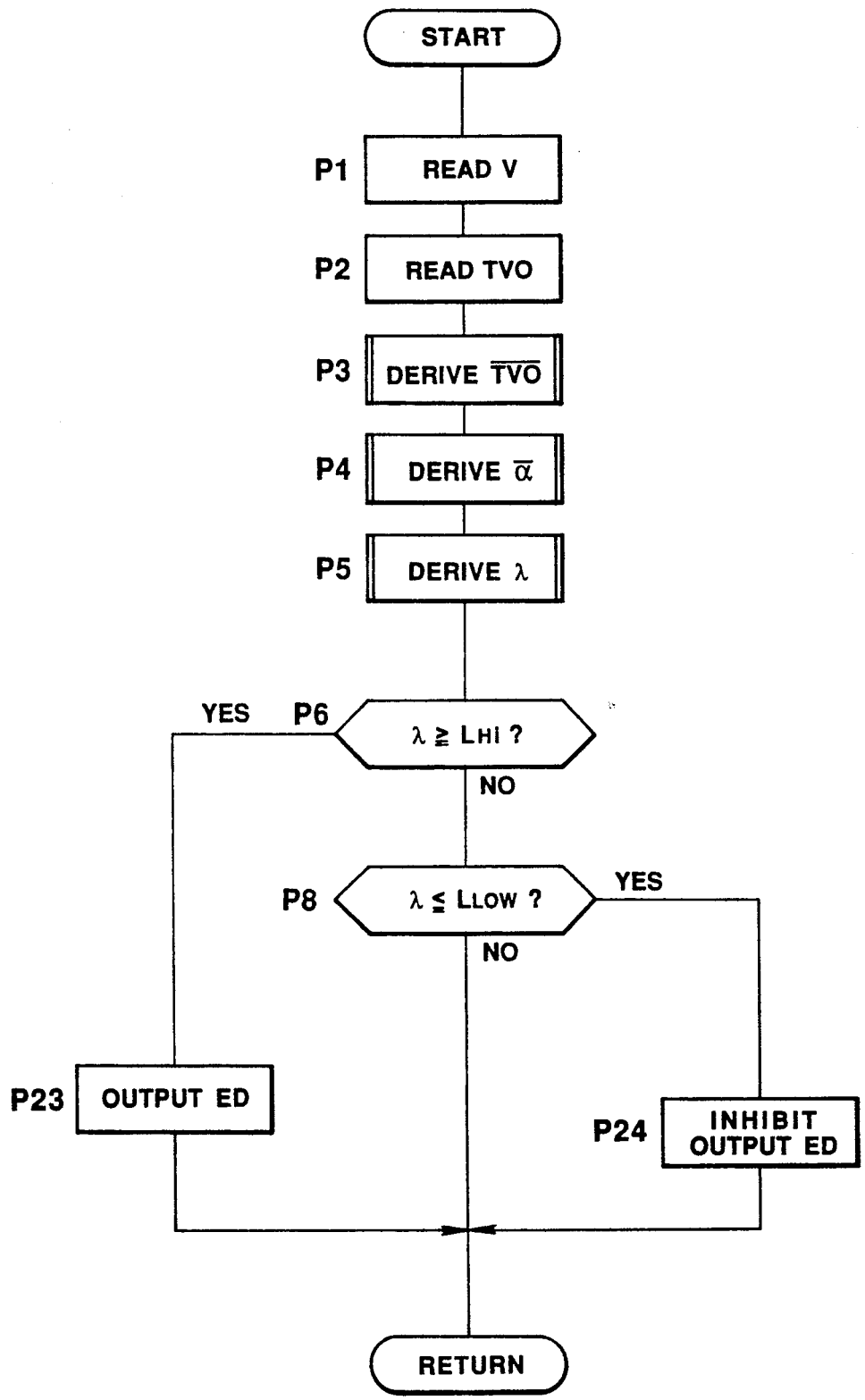

SHIFTING CONTROL SYSTEM FOR AUTOMOTIVE AUTOMATIC POWER TRANSMISSION WITH ENHANCED VARIABLE SHIFT PATTERN SELECTION DEPENDING UPON A RESISTANCE BASED UPON VEHICLE ACCELERATION AND AN ENGINE PARAMETER

This application is a continuation of application Ser. No. 07/863,314, filed Apr. 1, 1992, which is in turn a continuation application of Ser. No. 07/499,584, filed on Mar. 27, 1990 now both abandoned.

BACKGROUND OF THE INVENTION

1. Field of the Invention

The present invention relates generally to a shift control system for an automatic power transmission of an automotive vehicle. More specifically, the invention relates to a shift control system which selects an optimal transmission speed ratio shifting pattern depending upon vehicle driving conditions. Further particularly, the invention relates to a shifting pattern selection during up- and down-hill driving for selecting an optimal speed ratio shifting pattern for enhanced shift feeling.

2. Description of the Background Art

Some of modern automatic power transmissions are associated with electric or electronic control systems which detect vehicle driving conditions and which select an optimal transmission speed ratio. In such shift control systems, a plurality of speed ratio shifting patterns are set so that optimal one of the patterns is selected depending upon the vehicle driving conditions. Typically, the shift patterns are determined experimentarily and set in relation to typical driving conditions. Therefore, under a vehicular driving condition coincidence with one of the typical driving conditions or close thereto, the transmission speed ratio selection results in providing optimal shifting performance. In contrast to this, when a vehicle driving condition is far different from any one of the typical driving conditions, such as up- or down-hill driving, when the passenger load is substantially heavy, under cold engine condition and so forth, the speed ratio selection fails to provide optimal shifting performance.

For instance, since the transmission speed ratio shift pattern is generally set in terms of a vehicle speed and a throttle valve open degree. In the hill climbing, the vehicle speed tends to vary according to the gradient of the road. Therefore, there has been experienced a so-called busy shifting between a higher speed ratio and a lower speed ratio. Such busy shifting may cause degradation of the riding comfort of the vehicle and vehicular drive feeling. For avoiding this, Japanese Patent First (unexamined) Publication (Tokkai) Showa 62-180153 discloses a transmission speed ratio shift control technology which includes detection of the hill climbing condition of the vehicle on the basis of the engine load and the vehicle speed. In the disclosed technology, the vehicle speed is monitored in relation to the engine load, e.g. the throttle valve open angle, for making judgement of hill climbing when the vehicle speed is lowered at constant engine load for selecting shift pattern set for hill climbing. Alternatively, Japanese Patent First Publication (Tokkai) Showa 62-165052 discloses a shift control system which monitors a frequency of shifting and thus detects busy shifting based on the frequency of occurrence of shifting to vary shifting pattern for avoiding busy shifting.

On the other hand, Japanese Patent First Publication (Tokkai) Showa 63-167161 discloses passenger load dependent shift pattern selection, in which number of passenger boarding on a vehicle is counted and shift pattern is selected based on the number of boarded passengers.

These prior proposed shift control systems are effective at specific vehicle driving conditions. Therefore, such prior proposed system cannot provide optimal selection of the transmission speed ratio in the practical driving condition.

As can be appreciated, an optimal or ideal speed ratio selection should establish a transmission speed ratio at which enough but not excessive driving torque is applied to the driving wheels, depending upon the running resistance exerted on the vehicle. Therefore, in order to appropriately select the transmission speed ratio, it is important to precisely detect the running resistance on the vehicle. In case of a manual transmission, running resistance is measured by a driver so that he may select an optimal gear position based on the measured running resistance. Therefore, level of skill of selection of the gear position in the manual transmission is determined depending upon the precision level of judgement of the driving condition. Therefore, the ideal shift control system for the automatic power transmission has to have capability of precise judgement of the vehicle driving condition equivalent to that of the qualified driver.

In this sense, the prior proposed shift control systems are not at all complete either in judgement of the vehicle driving condition or in selection of the speed ratio.

SUMMARY OF THE INVENTION

Therefore, it is an object of the present invention to provide a shift control system for an automatic power transmission which can precisely detect the vehicle driving condition and thus can provide enhanced transmission speed ratio selecting performance.

Another object of the invention is to provide a shift control system which can adapt speed ratio shift pattern at any vehicle driving condition.

According to the present invention, there are provided a vehicle including an engine with a throttle valve, an automatic power transmission drivingly connected to the engine, and driving wheels drivingly connected to the automatic power transmission, the vehicle comprising:

means for detecting a parameter indicative of an output of the engine and generating a parameter indicative signal;

means for generating an acceleration indicative signal indicative of an acceleration which the vehicle is subject to;

means for correlating said parameter indicative signal with said acceleration indicative signal to deduce a magnitude of a resistance which the vehicle is subject to and generating a resistance indicative signal of said magnitude of said resistance deduced;

means for determining a speed ratio to be established in the automatic transmission in response to said resistance indicative signal.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 1 is a schematic block diagram of the first embodiment of a shift control system for an automatic power transmission according to the present invention;

FIG. 2 is flowchart showing a process of a shift control to be carried out by the first embodiment of the shift control system of FIG. 1;

FIG. 9 is a block diagram of the second embodiment of a shift control system for an automatic power transmission, according to the present invention;

FIGS. 14 and 16 are schematic block diagrams of the fourth and fifth embodiments, respectively, of a shift control system according to the present invention;

FIG. 15 is a flowchart of the process of a shift control to be carried out by the fourth embodiment of the shift control system of FIG. 14;

FIG. 18 is a flowchart showing a process of a shift control to be carried out in the fifth embodiment of the shift control system of FIG. 16; and.

DESCRIPTION OF THE PREFERRED EMBODIMENT

Figure 3A:
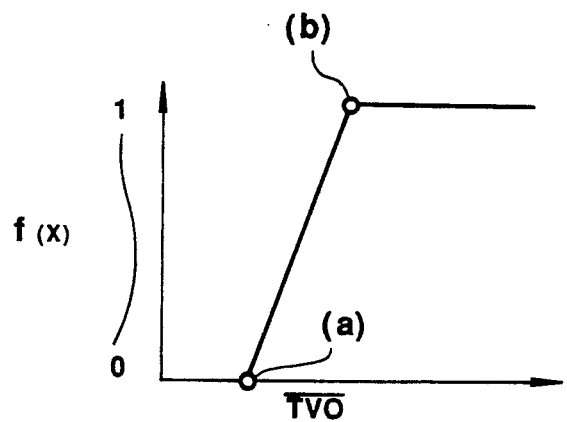
FIGS. 3(A) and 3(B) are charts showing variations of traveling resistance representative index value tables f(x) and g(z)

Referring now to the drawings, particularly to FIG. 1, the first embodiment of a shift control system for an automatic power transmission, according to the present invention, includes a sensor group 1. In the shown embodiment, the sensor group 1 comprises a throttle angle sensor 2, a vehicle speed sensor 3, a fuel type detector 4, an engine coolant temperature sensor 5, an automatic transmission oil (ATF oil) temperature sensor 6 and a vehicular load sensor 7. The throttle angle sensor 2 monitors a throttle valve opening degree to produce a throttle valve opening degree indicative signal TVO representative of the monitored throttle opening angle. The vehicle speed sensor 3 monitors a vehicle speed to output a vehicle speed indicative signal V. The fuel type detector 4 detects a kind of fuel used in the engine and produces a fuel type indicative signal F. The engine coolant temperature sensor 5 is disposed in a water jacket in an engine block for monitoring a temperature of an engine coolant therein to produce an engine coolant temperature indicative signal $T_F$. The ATF oil temperature sensor 6 monitors a temperature condition of a lubricant oil in the automatic power transmission to produce an ATF oil temperature indicative signal $T_O$. The vehicular load sensor 7 monitors a passenger weight, a luggage weight and so forth as load on the vehicle to produce a vehicular load indicative signal W.

The throttle angle sensor 2 and the vehicle speed sensor 3 in the sensor group 1 are connected to an automatic power transmission control unit (ATCU) 10. The ATCU 10 stores transmission speed ratio shifting patterns which are to be used for determining an optimal speed ratio in terms of the throttle valve opening degree as represented by the throttle valve angle indicative signal TVO and the vehicle speed as represented by the vehicle speed indicative signal. The ATCU 10 derives a shift control signal SEL indicative of the determined speed ratio. The shift control signal SEL is fed to a valve controller 11 for operating various valves, such as shift valves, timing valves and so forth for establishing the transmission speed ratio as commanded by the shift control signal SEL.

In the shown embodiment, the shift control system is applied to an automatic power transmission which has four forward speed ratios including an over-drive (OD) speed ratio as the fourth speed ratio. The shift control system selects one of the first speed ratio, the second speed ratio, the third speed ratio and the fourth (OD) speed ratio according to a preset shift pattern set in terms of the throttle valve opening degree and the vehicle speed. The shift control includes an OD inhibit mode for inhibiting shifting up to the fourth speed ratio.

The ATCU 10 is associated with a subsidiary controller 20 which serves as an acceleration detecting means and running resistance deriving means. The fuel type detector 4, the engine coolant temperature sensor 5, the ATF oil temperature sensor 6 and the vehicular load sensor 7 are connected to the subsidiary controller 20 for inputting the fuel type indicative signal F, the engine coolant temperature indicative signal $T_F$, the ATF oil temperature indicative signal $T_O$ and the vehicular load indicative signal W. The subsidiary controller 20 is further connected to the throttle angle sensor 2 and the vehicle speed sensor V to receive the throttle valve opening degree indicative signal TVO and the vehicle speed indicative signal V. The subsidiary controller 20 derives a running average $\overline{TVO}$ (commonly referred to as a moving average) on the basis of the throttle valve opening degree indicative signal TVO. Also, the subsidiary controller 20 derives a vehicular acceleration $\alpha$ on the basis of variation of the vehicle speed indicative signal V. Based on the running average $\overline{TVO}$ of the throttle valve opening degree and the vehicular acceleration $\alpha$, a predicted value $\lambda$ of a running resistance on the vehicle is derived. The subsidiary controller 20 compares the running resistance predicted value $\lambda$ with a predetermined reference value so as to inhibit shifting up to the fourth (OD) speed ratio when the predicted value is greater than the predetermined reference value.

Figure 3B:
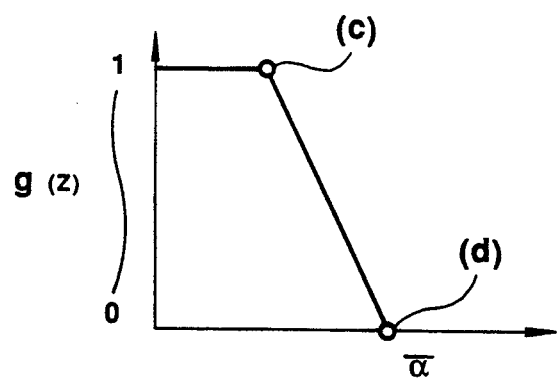

FIGS. 3(A) and 3(B) show resistance representative index value tables to be used in derivation of the predicted value $\lambda$. As can be seen for deriving the predicted value λ, the resistance representative index value tables f(x) and g(z) are used. FIG. 2 shows the process to be performed by the subsidiary controller 20. In the shown process, the vehicle speed indicative signal V and the throttle valve opening degree indicative signal TVO are read at steps P1 and P2. Then, at a step P3, the running average $\overline{TVO}$ is derived on the basis of the throttle valve opening degree indicative signal TVO. The running average $\overline{TVO}$ is derived through the following equation:

$$TVO(t) = \frac{(n-1)TVO(t-1) + TVO(t)}{n} \quad (1)$$

As is well-known in the art, "n" represents the number of the sample and "t" represents the present run of the routine. Through the process at the step P3, an influence of fluctuations of the throttle valve opening degree indicative signal TVO due to frequent angular displacement of the throttle valve is successfully avoided. As can be appreciated, the process at the step P3 is equivalent to applying a primary filter. Therefore, instead of providing step P3, a low pass filter for removing noise components can be used as a hardwear element for achieving substantially the same effect to that achieved by the step P3 of the shown process. In either case, a time constant for filtering the throttle valve opening degree indicative TVO is preferably set to approximately 20 sec.

Figure 4:
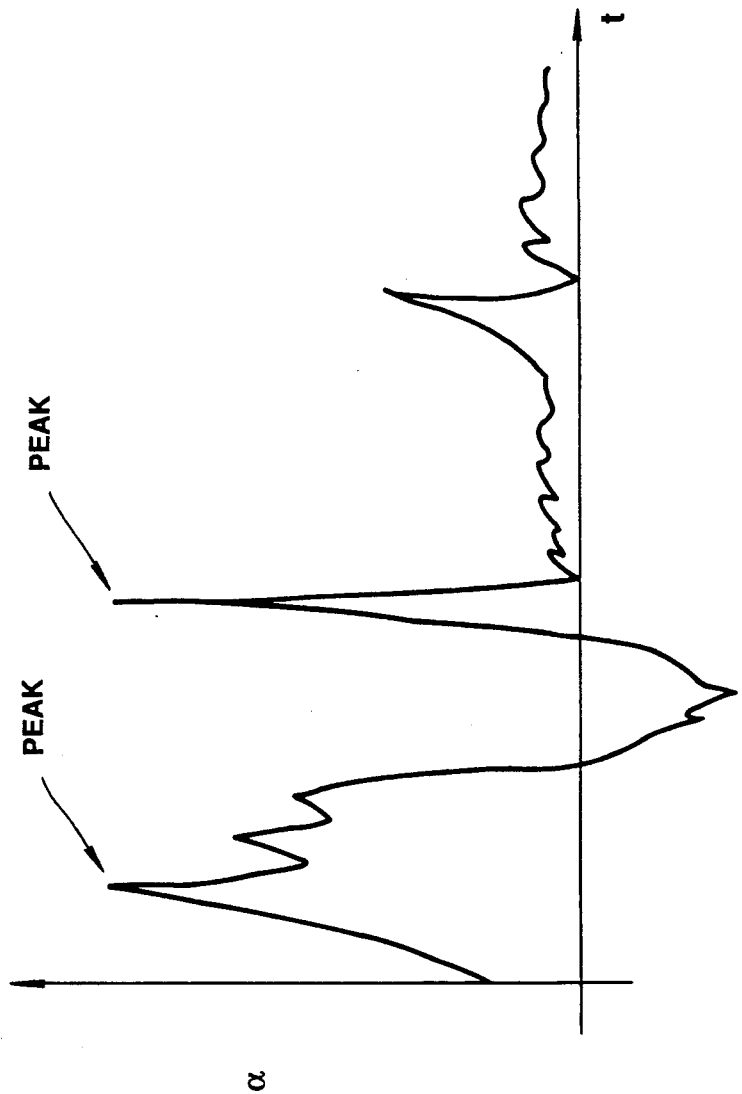
FIG. 4 is a chart showing waveforms representative of distribution of acceleration.
Figure 5:
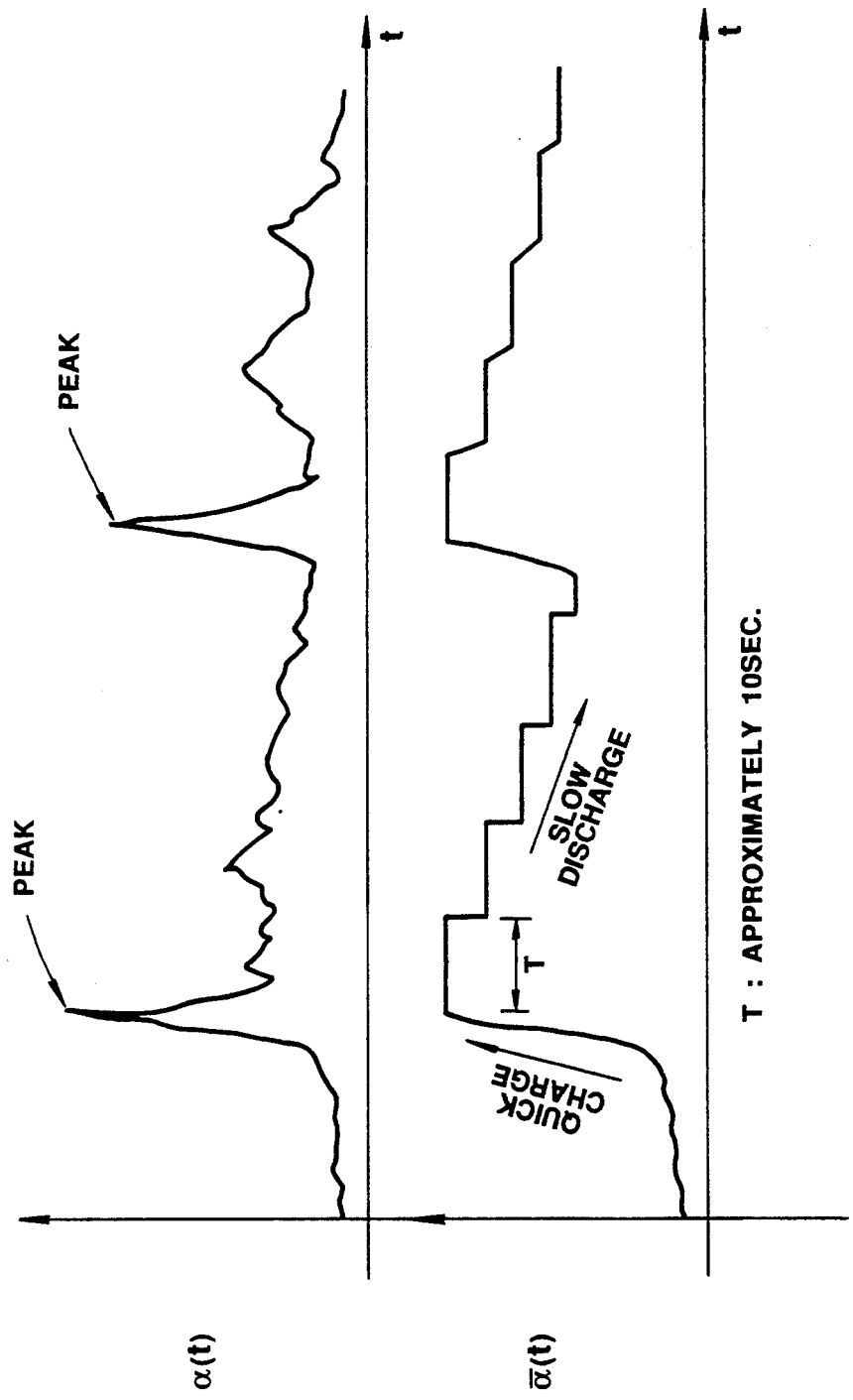
FIG. 5 is a chart showing waveforms of the acceleration and filtered signal thereof.

At a step P4, the vehicular acceleration α is derived on the basis of the vehicle speed indicative signal V. Typically, the vehicular acceleration α is derived by measuring a difference Δv(t) within a predetermined period Δt. The difference Δv(t) may be used as the vehicular acceleration representative data. However, since such difference Δv(t) may cause substantial fluctuations, a smoothed value of the difference Δv(t) is used as the vehicular acceleration α. However, for smoothing, the primary filtering process will not be used because the distribution of α(t) becomes as shown in FIG. 4 and has sharp peaks, the magnitude of which peak is used as important information. Therefore, for smoothing to derive the vehicular acceleration α, a filter having mutually different time constants in charging and discharging is used. Namely, as shown in FIG. 5, by providing a small time constant for charging, the peak information is obtained by a quick charge and by providing a greater time constant, continuity to the next peak can be provided by a slow discharge. With this process, a rapid change of the vehicular acceleration can be successfully detected and erroneous detection can be avoided.

Based on the running average $\overline{TVO}$ of the throttle valve opening degree indicative signal TVO, which $\overline{TVO}$ serves as the engine operating condition indicative parameter, and the vehicle acceleration α, the vehicular running resistance predicted value λ is derived at a step P5. In the practical process of derivation of the predicted value λ, the table of FIG. 3(A) is looked up in terms of the running average $\overline{TVO}$ to derive f(x). On the other hand, the table of FIG. 3(B) is looked up in terms of α to derive g(z). The derived values f(x) and g(z) are compared to each other for selecting the smaller one to set as the predicted value λ.

As can be seen, the function f(x) in FIG. 3(A) is a linear resistance representative index value varying in a range between zero and one in response to variations of the throttle valve opening degree running average $\overline{TVO}$ in a range between points a and b. The point a is set at a value of the running average $\overline{TVO}$ corresponding to normal state throttle valve opening degree on a flat road and, on the other hand, the point b is set at a value of running average $\overline{TVO}$ corresponding to throttle valve opening degree at up hill road with relatively large gradient. The resistance representative index value g(z) varies between points c and d as a linear resistance representative index value. The point c is set at a vehicle acceleration α at a slope road and the sloped point d is set at a vehicle acceleration at a flat road.

It should be appreciated that the variation characteristics of f(x) and g(z) in terms of the running average $\overline{TVO}$ and the vehicle acceleration α in FIGS. 3(A) and 3(B) are mere examples and can be set in various fashions as desired.

In general, assuming that a running resistance on the vehicle is zero, the vehicle will be accelerated even with a small driving torques torque of the engine transmitted to the driving wheels. In such case, it will be appreciated that the vehicle is accelerated by any driving torque greater than the running resistance. Further assuming that the magnitude of running resistance is A, and the driving torque transmitted to the driving wheel is A' which is substantially equal to A, the vehicle will maintain the instantaneous speed without causing acceleration or deceleration. At this condition, if running resistance A is increased in a magnitude of ΔA, the vehicle will be decelerated if the driving torque A' is maintained. Therefore, at this time, the vehicular acceleration α should become negative. Therefore, in practice, if the throttle valve opening degree as represented by the running average $\overline{TVO}$ is increased and the vehicular acceleration α is correspondingly increased, a judgement can be made that the running resistance is small. On the other hand, when the throttle valve opening degree is maintained substantially constant and the vehicular acceleration α is decreased, a judgement can be made that the running resistance is large. Also, when the throttle valve opening degree is increased and the vehicular acceleration fails to increase correspondingly or decreases, a judgement can be made that the running resistance is large. Therefore, the vehicular running resistance can be deduced by monitoring the correlation between the driving torque output from the engine and the magnitude of vehicular acceleration.

At a step P6, the predicted vehicular resistance representative value λ is compared with a resistance upper criterion $L_{Hi}$ which serves as an OD shifting inhibiting criterion. If the predicted value λ is greater than or equal to the resistance upper criterion $L_{Hi}$ as checked at the step P6, shifting of the fourth (OD) speed ratio is inhibited by outputting an inhibit signal $OD_{INH}$ at a step P7. On the other hand, when the predicted value λ is smaller than the resistance upper criterion $L_{Hi}$, the predicted value λ is compared with a resistance lower criterion $L_{LOW}$ which serves as an OD shifting resuming criterion, at a step P8. The resistance lower criterion $L_{LOW}$ is set at a smaller value than the resistance upper criterion $L_{Hi}$ for providing hysterisis in switching of OD inhibiting state and OD enabling state. If the predicted value λ is greater than the resistance lower criterion $L_{LOW}$ as checked at the step P8, the process goes to END before returning to a main or background routine. On the other hand, when the predicted value λ is smaller than or equal to the resistance lower criterion $L_{LOW}$, then the inhibit signal $OD_{INH}$ is terminated for enabling shifting up to the fourth (OD) speed ratio, at a step P9.

As can be appreciated, through the process set forth above, the transmission speed ratio shift pattern is selected among a plurality of shift patterns depending upon the running resistance λ derived on the basis of the smaller one of the resistance representative index values f(x) and g(z). Therefore, the shift pattern of transmission speed ratio can be appropriately and optimally selected depending upon gradient of the road, magnitude of road/tire friction, vehicular load, i.e. number and weight of boarding passengers and loaded luggages, strength of wind and other environmental condition of the vehicle.

Though the shown embodiment employs the running average $\overline{TVO}$ of the throttle valve opening degree as the engine driving condition indicative parameter, it should be appreciated that any other equivalent parameter could be used. For example, as the engine driving condition indicative parameter, a product derived by dividing the throttle valve opening angle running average $\overline{TVO}$ by the engine speed Ne, an intake air flow rate and so forth may be employed. Furthermore, though the shown embodiment selects the smaller one of the resistance representative index values f(x) and g(z) derived from the tables of FIGS. 3(A) and 3(B), it is not essential to select the smaller one of these functions. Furthermore, the resistance representative index value tables in FIGS. 3(A) and 3(B) can be modified in various fashion employing other parameters or additional parameters. For example, depending upon octan value of gasoline to be used for the engine, the point c in FIG. 3(B) can be varied. For instance, when the octan value of the fuel is relatively high, the point c can be set at a higher value, or, in the alternative, the resistance upper criterion $L_{Hi}$ is set at a greater value. On the other hand, when the vehicular load due to the number of boarding passengers and/or weight of luggages is relatively heavy, the point c of the resistance representative index value g(z) may be lowered or the resistance upper criterion $L_{Hi}$ may be set at a smaller value. As will be appreciated, the engine output is lowered depending upon integrated traveling distance. Therefore, the point c of the resistance representative index value g(z) can be varied depending upon the integrated traveling distance. Namely, when the integrated traveling distance becomes substantially long, the point c may be set at a lower value. Also, when the engine or engine coolant temperature decreases excessively high, the engine output becomes Therefore, the point c of the resistance representative index value g(z) can be lowered in response to the excessively high engine or engine coolant temperature. In addition, the resistance representative index values f(x) and g(z) can be varied according to the vehicle speed. When the vehicle speed becomes substantially and engine speed is naturally increased, there is the possibility that the output torque of the engine drops. In such case, the running resistance representative predicted value λ increases to produces a judgement of high running resistance condition even when the vehicular load is not so heavy and the road is flat. If selection of the fourth (OD) speed ratio is inhibited, the engine speed is maintained at a substantially high speed. Therefore, by raising the point b of the resistance representative index value f(x) according to increasing of the vehicle speed, an unexpected increase of the predicted value λ can be avoided. In the alternative, it may also be possible to stop derivation of the predicted value at a vehicle speed higher than a predetermined speed, e.g. 120 km/h. Furthermore, it may be possible to vary the resistance representative index values f(x), g(z) and/or the resistance upper criterion $L_{Hi}$ according to the number of occurrences of inhibiting of the selection of the fourth speed ratio. Also, it may be possible to vary the resistance representative index values f(x), g(z) and/or the resistance upper criterion $L_{Hi}$ according to a remaining fuel amount.

Figure 6:
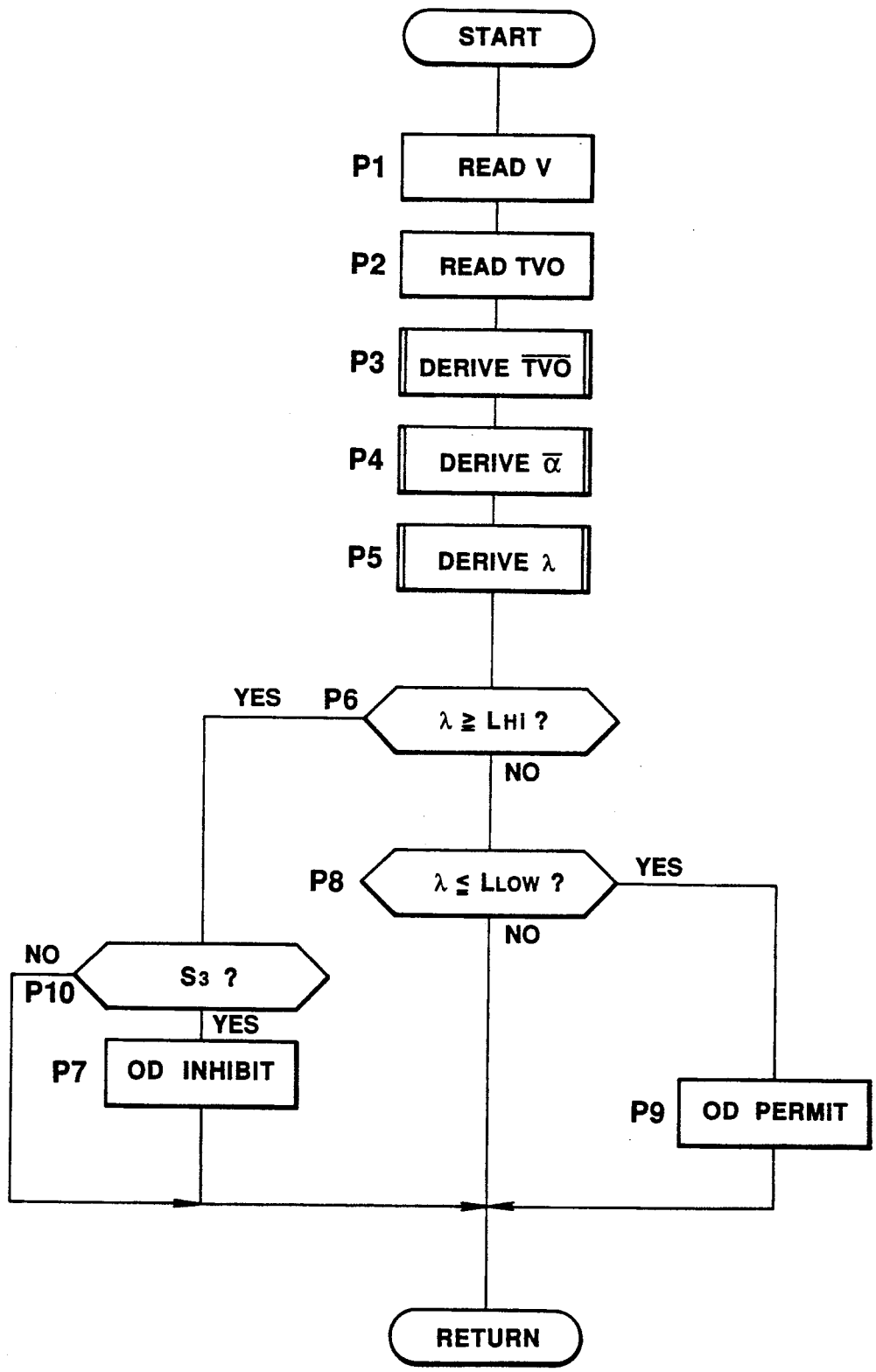
FIG. 6 is a flowchart showing a modified process of a shift control to be carried out by the first embodiment of the shift control system of FIG. 1.

FIG. 6 is a modification of the process of FIG. 2. In the shown process, a step P10 is added. At the step P10, the instantaneous speed ratio is checked to determine whether the current speed ratio is a predetermined speed ratio for inhibiting selection of the fourth speed ratio. In order to enable this, the ATCU outputs a specific speed ratio indicative signal $S_3$ which represents the predetermined speed ratio as selected. In the shown embodiment, the specific speed ratio indicative signal $S_3$ is output when the selected speed ratio is the third speed ratio. The ATCU 10 feeds the specific speed ratio indicative signal $S_3$ to the subsidiary controller 20. Therefore, at the step P10, the presence of the specific speed ratio indicative signal $S_3$ is checked. If the specific speed ratio indicative signal $S_3$ is detected at the step P10, the process goes to the step P7 to output the inhibit signal $OD_{INH}$ for inhibiting selection of the fourth speed ratio. On the other hand, when the specific speed ratio indicative signal $S_3$ is not detected as checked at the step P10, the process jumps the step P7 and directly goes to END.

Through this modified process, inhibiting of selection of the fourth speed ratio may not occur when the fourth speed ratio is selected so as not to cause sudden change of the speed ratio to the lower speed ratio which clearly increases the engine speed for degradation of the driving stability and riding comfort.

Figure 7:
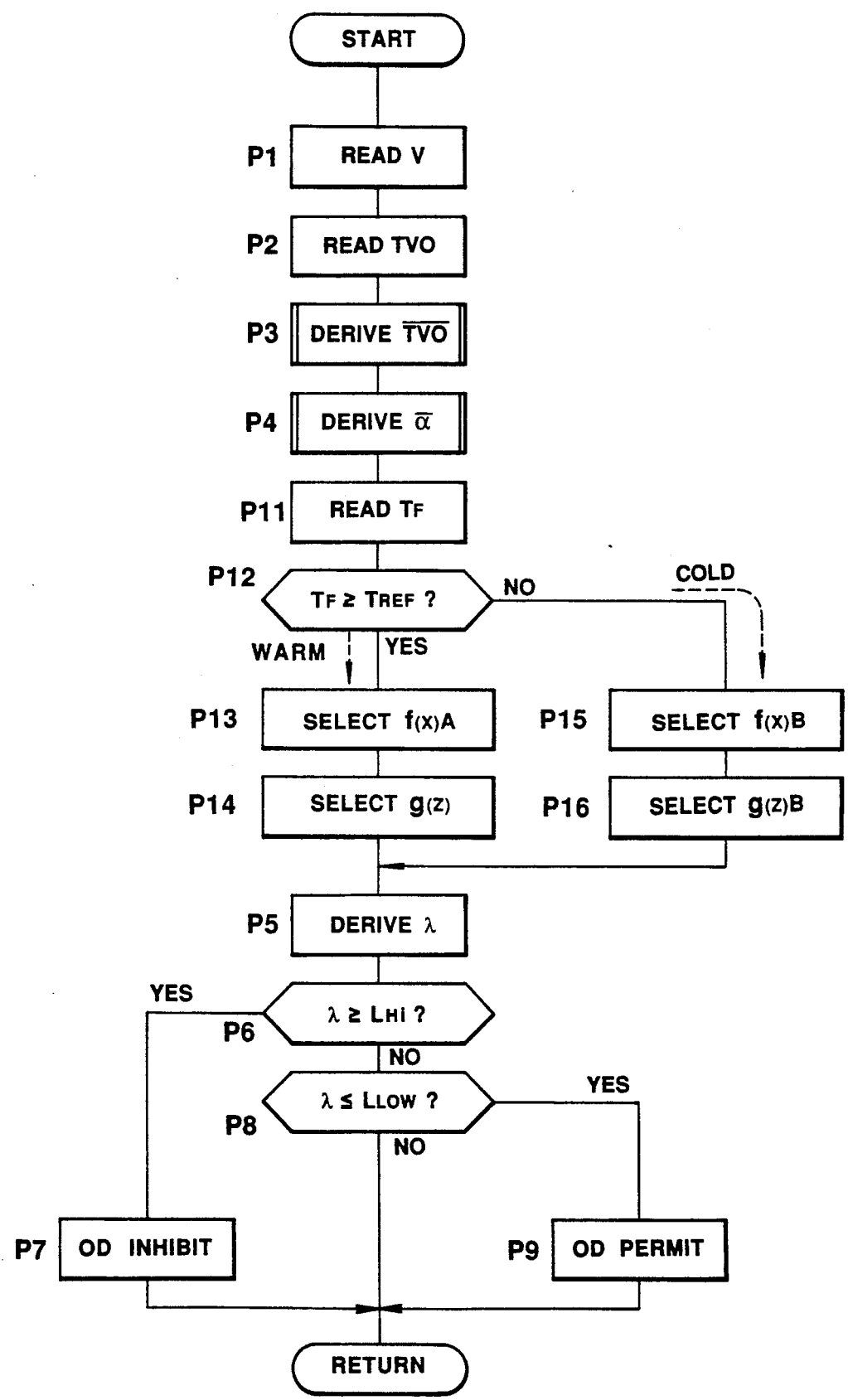
FIG. 7 is a flowchart showing another modified process of a shift control to be carried out by the first embodiment of the shift control system of FIG. 1.
Figure 8A:
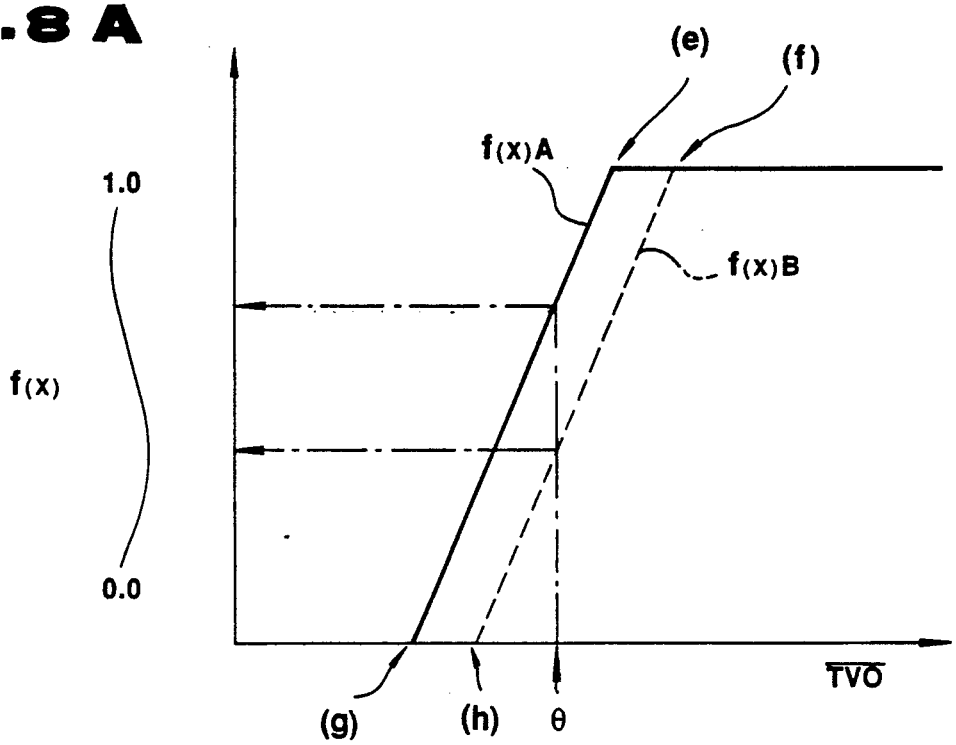
FIGS. 8(A) and 8(B) are charts showing traveling resistance representative index value tables f(x) and g(z) to be used in the process of FIG. 7.
Figure 8B:
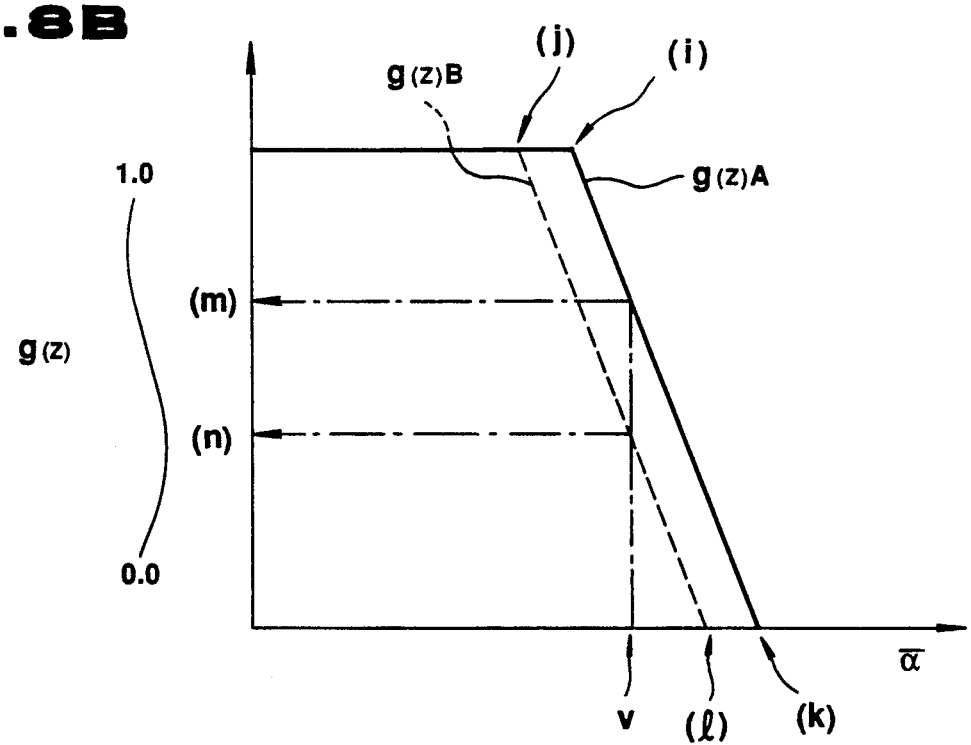

FIG. 7 shows another modification of the routine of FIG. 2. In the shown modification, the variation characteristics of resistance representative index values f(x) and g(z) are set variable depending upon the engine coolant temperature indicative signal value $T_F$ for implementing the engine or engine coolant temperature dependent running resistance predicted value variation. In the shown embodiment, variation characteristics of the resistance representative index values f(x) are set to vary between the characteristics illustrated by the solid and broken lines in FIG. 8(A). The variation characteristics f(x)A to vary between points e and g is selected when the engine is a warmed up and the variation characteristics f(x)B to vary between points f and h is selected when the engine is cold. Also, the variation characteristics of the resistance representative index values g(z) are set to vary between the characteristics illustrated by the solid and broken lines in FIG. 8(B). The variation characteristics g(z)A are set to vary between points i and k when the engine is in a warmed condition and the variation characteristics g(z)B is selected when the engine is in cold condition.

For implementing this, process steps P11 to P16 are added to the routine of FIG. 2. At the step P11, the engine coolant temperature indicative signal $T_F$ is read out. The engine coolant temperature indicative signal $T_F$ is then compared with a warmed engine criterion $T_{REF}$, at a step P12. The warmed engine criterion $T_{REF}$ is set at a temperature, e.g. 70° C. where the engine can be driven at normal state. If the engine coolant temperature indicative signal value $T_F$ is greater than or equal to the warmed engine criterion $T_{REF}$, the resistance representative index value f(x) is derived utilizing the characteristics f(x)A at a step P13 and the resistance representative index value g(z) is derived utilizing the characteristics g(z)A at a step P14. On the other hand, when the engine coolant temperature indicative signal value $T_F$ is smaller than the warmed engine criterion $T_{REF}$, as checked at the step P12, the resistance representative index value f(x) is derived utilizing the characteristics f(x)B at a step P15, and the resistance representative index value g(z) is derived utilizing the characteristics g(z)B at a step P16.

After one of the processes of step P14 and P16, the process goes to the step P5 for deriving the predicted value $\lambda$.

FIG. 9 shows the second embodiment of the shift control system according to the present invention. In the following discussion for the second embodiment, the components or elements which performs substantially equivalent operation to that of the former embodiment will be represented by the same reference numerals.

As can be seen from FIG. 9, the shown embodiment of the shift control system employs a selector 12 for manually selecting one of a plurality operation range, e.g. a 1 range for commanding holding at a first speed ratio, a 2 range for commanding holding at a second speed ratio or shifting between the first and second speed ratios, a D range for automatic speed ratio selection over first, second, third and fourth speed ratios, R range for commanding reverse drive, a N range for commanding neutral position of transmission gears for disconnecting the engine from the power train, and a P range for locking transmission gear for parking. The shift control system also employs an over-drive switch 13 for manually selecting OD inhibit state and OD permit state, a snow mode switch 14 for selecting shifting characteristics adapted for a road with a low friction coefficient, such an icy road, a snowy road and so forth and a shift pattern selector switch 15 for selecting one of a plurality of preset shift patterns, such as a normal mode pattern, a power mode pattern in which shift-up point of the speed ratio is set at greater throttle valve angular position than the normal mode pattern for better acceleration, and an economy mode pattern in which shift-up point of the speed ratio is set at a smaller throttle valve opening degree for better fuel economy. Respective of the selector 12, the over-drive switch 13, the snow mode switch 14 and the shift pattern selector switch 15 are designed to produce signals representative of respective switch positions. However, in the following discussions, the signals output from these switches 12, 13, 14 and 15 will be generally referred to as a select signal $S_F$. For convenience of the following discussion, it should be assumed that the selector signal $S_F$ is output when the selector 12 is other than the D range position, the over-drive switch 13 is an OD permit position, a snow mode switch is ON and the shift pattern selector switch 15 is set at positions other than that selecting automatic pattern selection.

Figure 10:
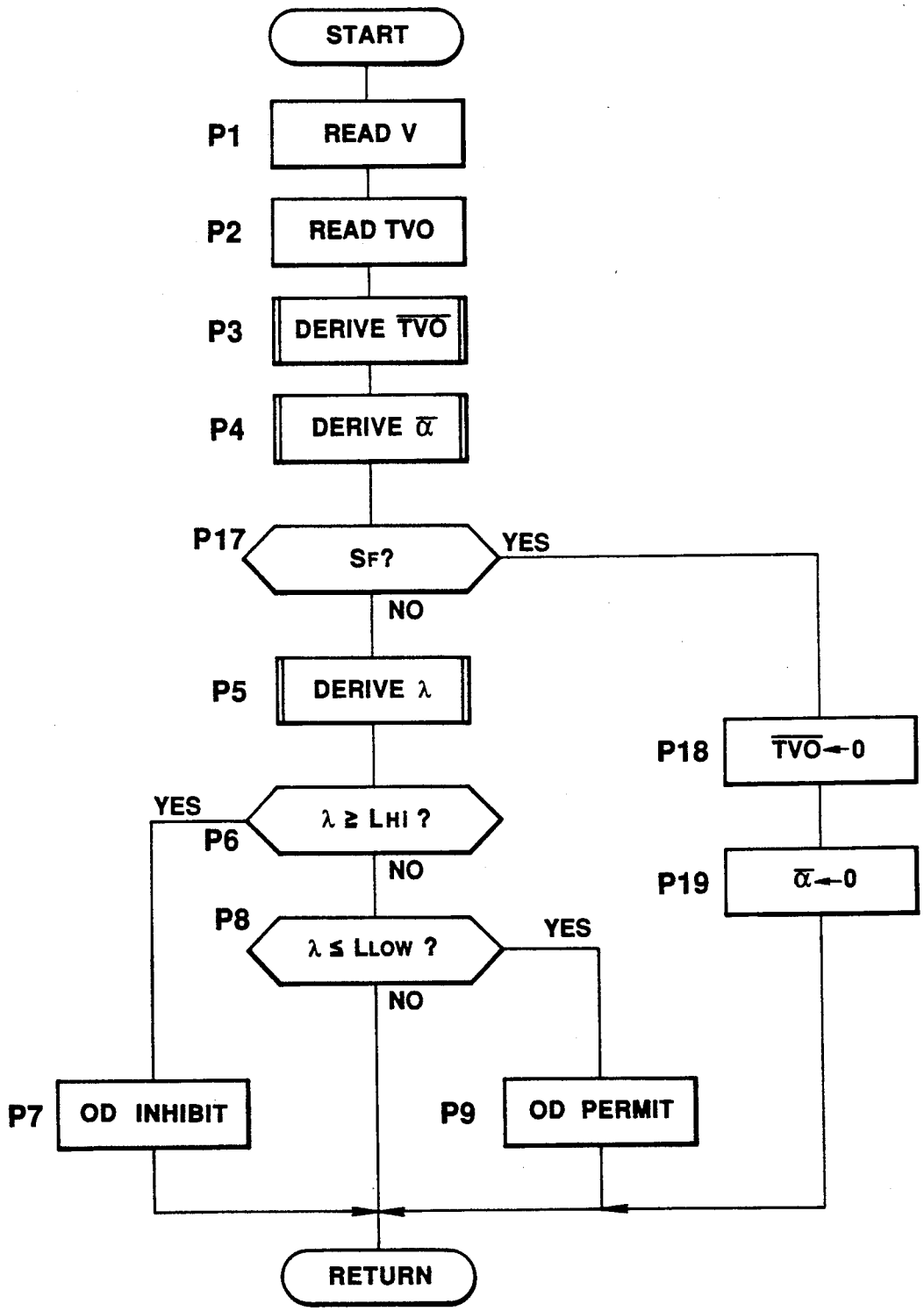
FIG. 10 is a flowchart showing a shift control process to be carried out in the second embodiment of the shift control system of FIG. 9.

FIG. 10 shows a routine modified from the routine of FIG. 2. As can be seen herefrom, steps P17 and P19 are added. At the step P17, the select signal $S_F$ is checked whether at least one of switches 12, 13, 14 and 15 is operated to enter manually entered command for commanding specific transmission operational mode set forth above. Since command for specific transmission operational mode is manually entered through the switches 12, 13, 14 and 15, it is a sign that driver intentionally select the specific transmission operational mode, it is preferred not to perform automatic shift pattern selection when the select signal $S_F$ is detected as checked at the step P17. Therefore, when the answer at the step P17 is positive, the process goes to a step P18 to clear the running average $\overline{TVO}$ and subsequently to a step P19 to clear the vehicular acceleration $\alpha$. After the step P19, the process directly goes to END.

Figure 11:
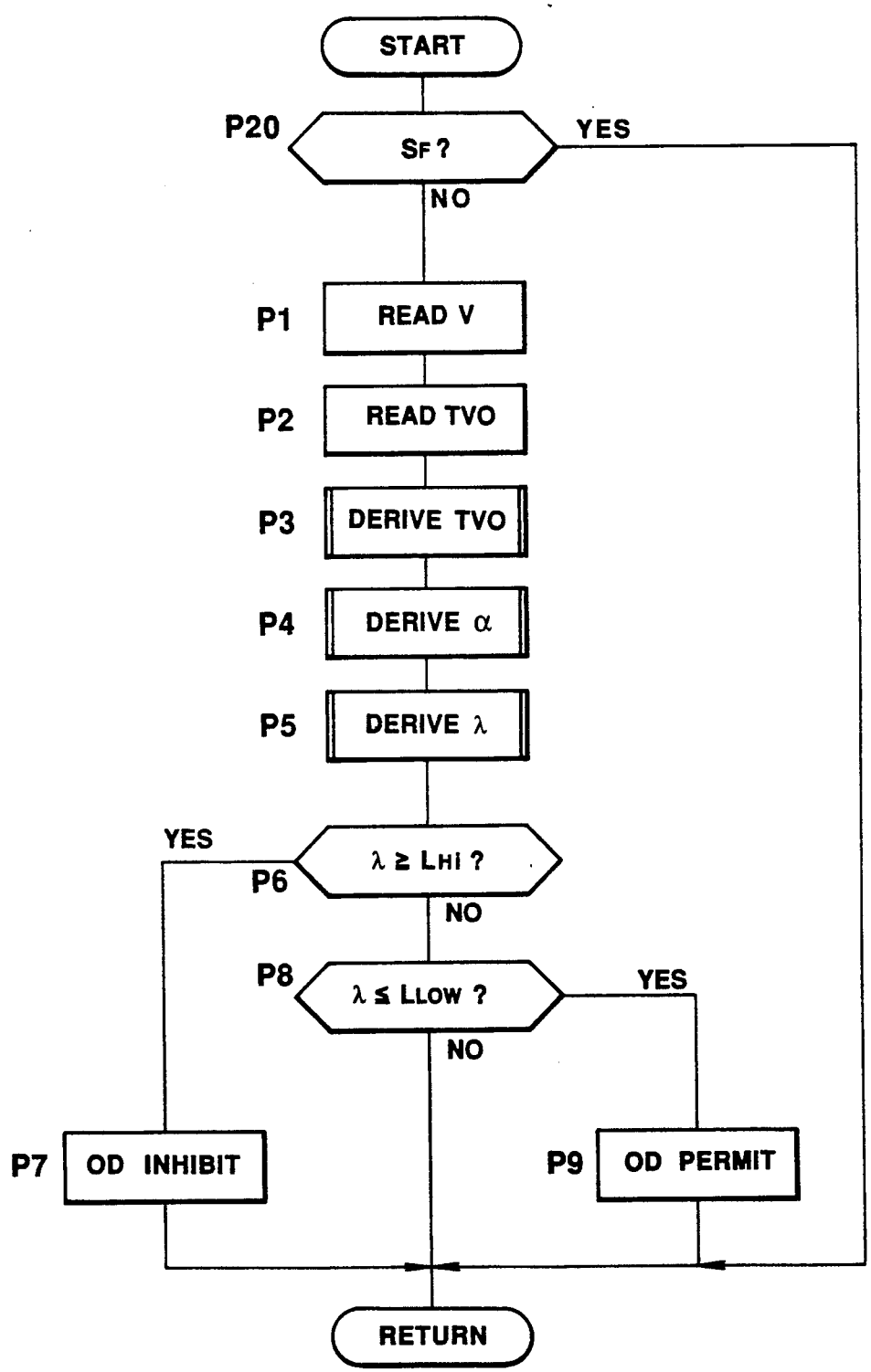
FIG. 11 is a flowchart showing a modified shift control process to be carried out in the second embodiment of the shift control system of FIG. 9.

FIG. 11 shows a modified routine of FIG. 10. In this modification, a step P20 is added in place of the steps P17 to P19 in the former embodiment. The principal difference of the shown routine from the former one is that the running average $\overline{TVO}$ and the vehicle acceleration $\alpha$ is maintained without resetting. For this, the step P20 is performed immediately after starting execution cycle of the shown routine. When the select signal $S_F$ is detected at the step P20 the process directly goes to END and therefore, no process for selecting the shift pattern is performed.

Figure 12:
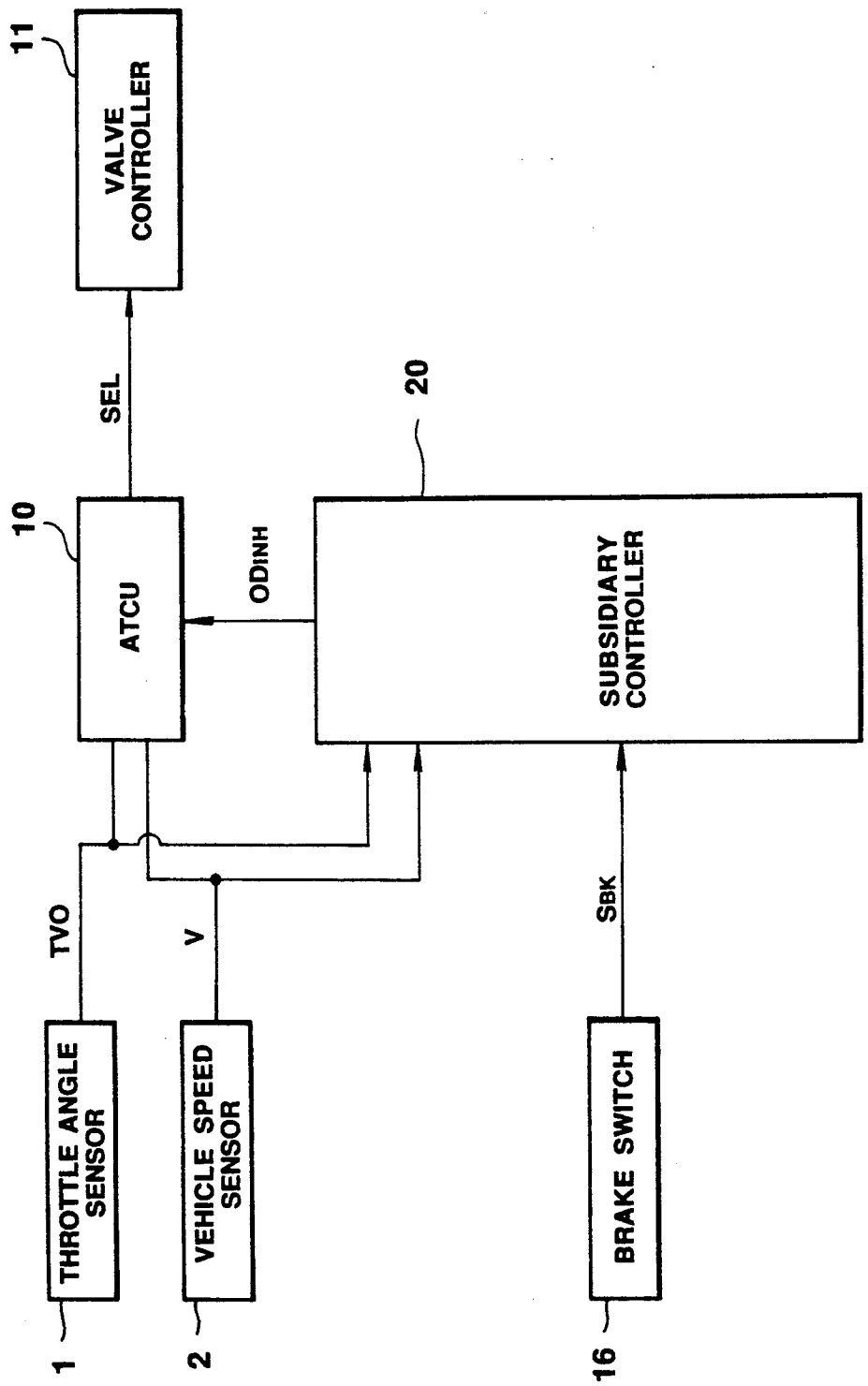
FIG. 12 is a schematic block diagram of the third embodiment of a shift control system for an automatic power transmission, according to the present invention.

FIG. 12 shows the third embodiment of the shift control system according to the present invention. In the shown embodiment, a brake switch 16 is connected to the subsidiary controller 20 for providing shift control parameter data to be processed by the subsidiary controller. The brake switch 16 is designed to output the vehicular braking state indicative signal $S_{BK}$ when a brake is applied.

Figure 13:
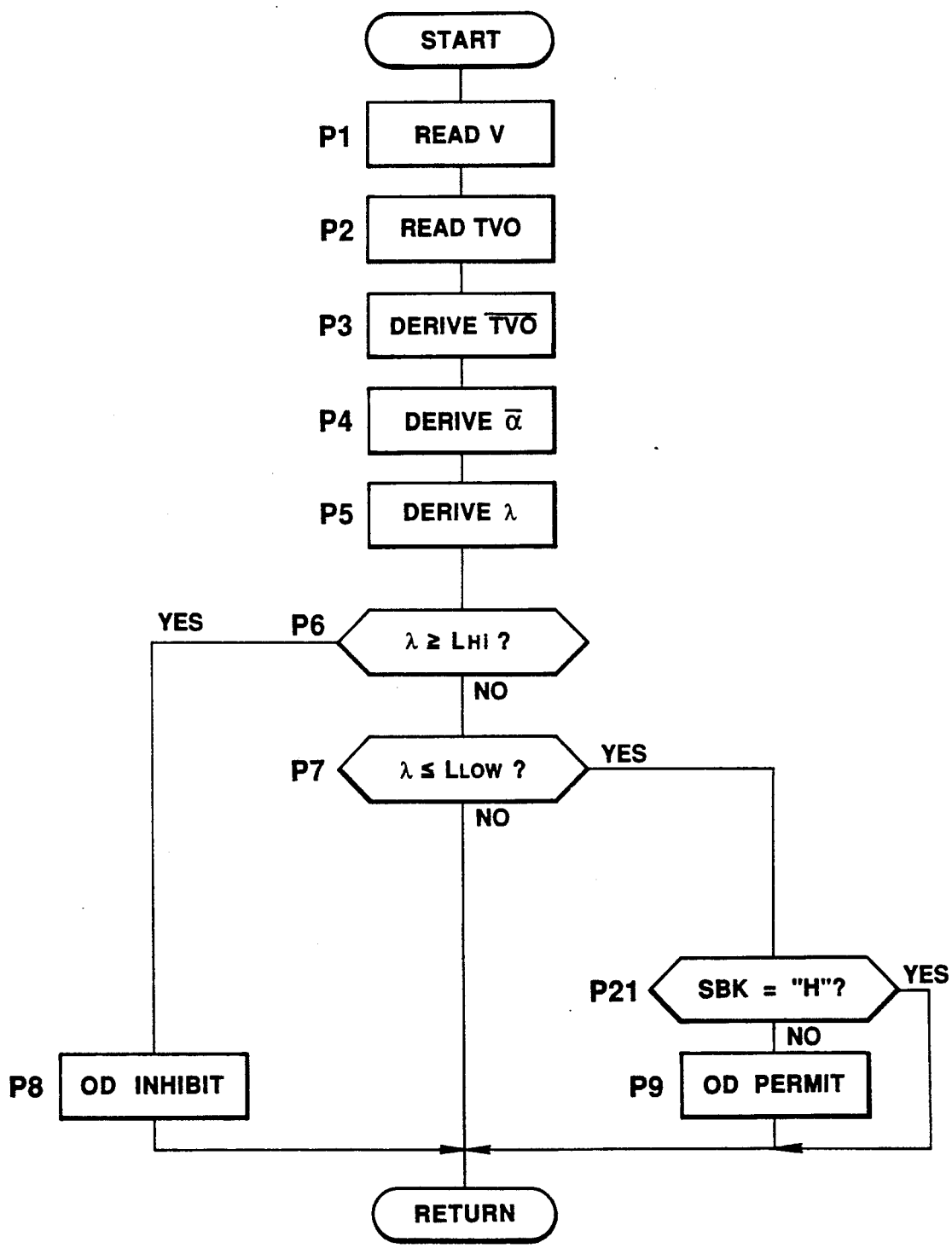
FIG. 13 is a flowchart of a shift control process to be carried by the third embodiment of the shift control system of FIG. 12.

FIG. 13 shows a routine modified from the routine of FIG. 2. In the shown routine, a step P21 is added. The step P21 is performed in advance of termination of the inhibit signal $OD_{INH}$, at the step P9. In the step P21, a check is performed whether the vehicular braking state indicative signal $S_{BK}$ is received or not. If the braking state indicative signal $S_{BK}$ is not detected, the process goes to the step P9. On the other hand, if the vehicular braking state indicative signal $S_{BK}$ is detected at the step P21, the process jumps P9 and thus directly goes to END.

Such a process is useful when the vehicle enters into a down-hill road requiring application of brake for deceleration, subsequent to a up-hill road, in which selection of the fourth (OD) speed ratio is inhibited. By preventing the process of the step P9, the selection of the OD speed ratio is inhibited for effecting greater magnitude of engine brake.

FIG. 14 shows a fourth embodiment of the shift control system according to the invention. In this embodiment, a shift pattern is selected depending upon the presence or absence of the leading vehicle and/or the distance to the leading vehicle. For this purpose, a leading vehicle detector unit 17 for detecting distance d and or relative speed v to the forward object, is provided. The leading vehicle detector unit 17 includes a sensor 19 and a signal processing circuit 18 for processing the output signal of the sensor. In the shown embodiment, the sensor comprises a transmitter for transmitting a distance measuring medium, such as radio waves, infrared light beams, microwaves and so forth and a receiver for receiving the medium reflected by the object.

It should be appreciated, that though the shown embodiment of the leading vehicle detector unit 17 is composed of the sensor and signal processing circuit, it can also be formed by an image pick-up device or image recognition system. Also, any of applicable remote sensing technologies may be employed as a replacement of the shown leading vehicle detecting unit.

The signal processing circuit 18 processes the input signal from the sensor 19 to derive an interval between the medium transmitting timing and the reflected medium receiving timing and to further derive a distance d to the object. The signal processing circuit 18 further derives a relative speed to the object to discriminate the leading vehicle from other obstacle. Namely, when the relative speed v is relatively small, judgement is made that the object is the leading vehicle. On the other hand, when the relative speed v substantially corresponds to the vehicular speed, then judgement can be made that the object is a stationary obstacle.

FIG. 15 shows a shift control routine to be executed by the shift control system of FIG. 14. In the shown routine, a step P22 is added. At the step P22, a check is performed whether the leading vehicle is present or not. In practice, the presence of the leading vehicle is performed by comparing the distance d as measured by the leading vehicle detecting unit 17, with a predetermined leading vehicle distance criterion. If the distance d is greater than the leading vehicle distance criterion, a judgement is made that the leading vehicle does not exist. Then, the through the steps P6 to P9 is performed for performing shift pattern selection. On the other hand, when the distance d is smaller than or equal to the leading vehicle distance criterion as checked at the step P22, the process directly goes to the step P9.

With the shown process, since inhibiting of selection of the fourth (OD) speed ratio is avoided when the leading vehicle is present, excess approach to the leading vehicle under high running resistance condition can be successfully prevented.

Figure 17A:
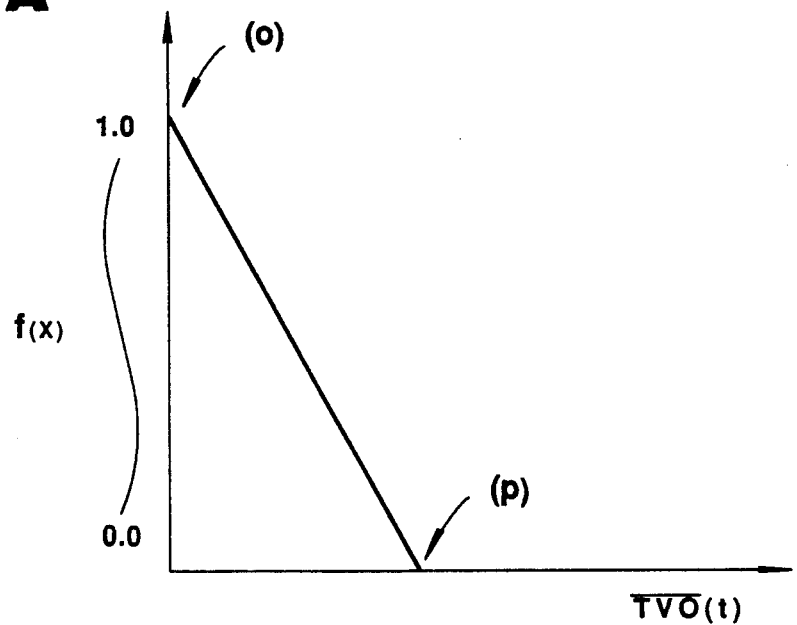
FIGS. 17(A) and 17(B) are charts showing resistance representative index value tables f(x) and g(z) to be utilized in the fifth embodiment of FIG. 16.
Figure 17B:
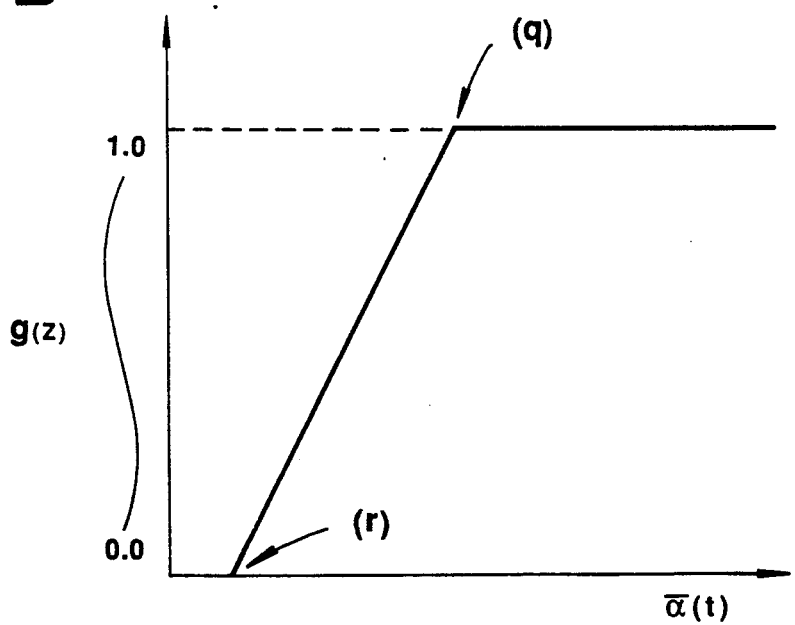

FIG. 18 shows a modified routine to be executed by the fifth embodiment of the shift control system of FIG. 16. The shown routine is different from that in FIG. 2 in that the permitted and inhibited speed ratio is a speed ratio selected for effecting engine braking for deceleration of the vehicle. For this, the variation characteristics of the resistance representative index values f(x) and g(z) are different from that of FIGS. 3(A) and 3(B) as shown in FIGS. 17(A) and 18(B). Namely, the resistance representative index value f(x) varies between points o and p according to variations of the funning average $\overline{TVO}$ of the throttle valve opening angle indicative signal values. It should be appreciated that in the characteristics of FIG. 17(A), the point o corresponds to the throttle valve fully closed position (throttle valve opening angle is zero) and the point p corresponds to the throttle valve opening angle to causing the engine speed at 2000 rpm at respective speed ratio. On the other hand, the resistance representative index value g(z) varies between r and q according to variations of the vehicle acceleration α. In the step P5, a down-slope gradient predicted value γ is derived on the basis of the functions f(x) and g(z). The point r corresponds to the vehicular acceleration in a substantially heavy vehicular load condition on the typical down slope, e.g. −10%, and the point p corresponds to the vehicular acceleration in substantially small load on the typical down slope. The operation in the step P5 is differentiated from that in the former embodiment which derives the running resistance predicted value λ.

As can be seen from FIGS. 18, the steps P7 and P9 are replaced with steps P23 and P24. The step P23 is performed when the predicted value γ is greater than or equal to the resistance upper criterion $L_{Hi}$ for outputting an engine braking commanding signal ED to select the specific speed ratio for effective engine braking. On the other hand, if the predicted value γ is smaller than or equal to the resistance lower criterion $L_{LOW}$, the outputting of the engine braking commanding signal ED is inhibited at the step P24.

Therefore, through the shown process, engine braking is effected only when the down slope gradient is greater than a predetermined engine braking criteria $L_{Hi}$ and $L_{LOW}$. This enables effecting of engine brake at the down slope which requires engine braking effect for assisting vehicular deceleration caused by application of the vehicular brake.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Though the shown embodiments selects shift pattern depending upon limited parameter data, it would be formulate shift control routine with combination of two or more routines in the shown embodiments.

What is claimed is:

1. In a vehicle including an engine having a throttle valve, an automatic power transmission drivingly connected to said engine, and driving wheels drivingly connected to said automatic power transmission, a system for controlling said automatic transmission comprising:

(A) means for monitoring an instantaneous throttle opening degree of said throttle valve and for generating an instantaneous throttle opening degree signal indicative of said monitored instantaneous throttle opening degree;

(B) means for monitoring an instantaneous speed of said vehicle and for generating an instantaneous vehicle speed signal indicative of said monitored instantaneous vehicle speed;

(C) means for deriving a target speed ratio in response to said instantaneous throttle opening degree signal and said vehicle speed signal and for shifting said automatic transmission to said target speed ratio, said target speed ratio varying in accordance with a first shift pattern versus varying instantaneous throttle opening degree signal and said instantaneous throttle opening degree signal;

(D) means for calculating the running average of said instantaneous throttle opening degree signals generated over a period of time to derive a parameter representative of a driving force applied to said driving wheels and for generating a driving force representative parameter signal indicative of said derived parameter;

(E) means for processing said instantaneous vehicle speed signals generated over a period of time to derive an acceleration to which the vehicle is subject and for generating an acceleration signal indicative of said derived vehicle acceleration;

(F) means for deducing a magnitude of a resistance to which said vehicle is subject in response to said driving force representative parameter signal and said acceleration signal and for producing a resistance signal indicative of said magnitude of said deduced resistance;

(G) means for comparing said resistance signal with a predetermined value; and (H) means for changing a pattern of variation for said speed ratio to a second shift pattern when said resistance indicative signal satisfies a predetermined relationship with said predetermined value.

2. In a vehicle including an engine with a throttle valve, an automatic power transmission drivingly connected to the engine, and driving wheels drivingly connected to the automatic power transmission:

means for detecting a running average of a throttle opening degree of the throttle valve and for generating a parameter indicative signal;

means for generating an acceleration indicative signal indicative of an acceleration to which the vehicle is subject;

means for correlating said parameter indicative signal with said acceleration indicative signal to deduce a magnitude of a resistance which the vehicle is subject to and for generating a resistance indicative signal indicative of said magnitude of said deduced;

means for determining a target speed ratio of the automatic transmission in response to said resistance indicative signal; and means for shifting the automatic transmission to establish said target speed ratio.

3. In a vehicle including an engine with a throttle valve, an automatic power transmission drivingly connected to the engine, and driving wheels drivingly connected to the automatic power transmission:

means for detecting a running average of a throttle opening degree of the throttle valve and for generating a parameter indicative signal;

means for generating an acceleration indicative signal indicative of an acceleration to which the vehicle is subject;

means for correlating said parameter indicative signal with said acceleration indicative signal to deduce a magnitude of a resistance which the vehicle is subject to and generating a resistance indicative signal indicative of said magnitude of said deduced resistance;

means for determining a target speed ratio of the automatic transmission in response to a speed ratio established in the automatic transmission and to said resistance indicative signal;

and means for shifting the continuously variable transmission to establish said target speed ratio.

4. In a vehicle including an engine with a throttle valve, an automatic power transmission drivingly connected to the engine, and driving wheels drivingly connected to the automatic power transmission;

means for detecting a running average of a throttle opening degree of the throttle valve and for generating a parameter indicative signal;

means for generating an acceleration indicative signal indicative of an acceleration to which the vehicle is subject;

means for detecting a temperature of the engine and for generating a temperature indicative signal indicative of said detected temperature of the engine;

means for correlating said parameter indicative signal with said acceleration indicative signal to deduce, in a manner responsive to said temperature indicative signal, a magnitude of a resistance to which the vehicle is subject and for generating a resistance indicative signal indicative of said magnitude of said deduced resistance;

means for determining a target speed ratio of the automatic transmission in response to said resistance indicative signal; and means for shifting said automatic transmission to establish said target speed ratio.

5. In a vehicle including an engine with a throttle valve, an automatic power transmission drivingly connected to the engine, and driving wheels drivingly connected to the automatic power transmission:

means for detecting a running average of a throttle opening angle of the throttle valve and for generating a parameter indicative signal;

means for generating an acceleration indicative signal indicative of an acceleration to which the vehicle is subject;

means for detecting a manual command by which the automatic transmission is adapted to operate in a predetermined operational mode and for generating a manual command indicative signal indicative of said detected manual command detected;

means for correlating said parameter indicative signal with said acceleration indicative signal to deduce a magnitude of a resistance to which the vehicle is subject and for generating a resistance indicative signal indicative of said deduced magnitude of said resistance;

means for determining a target speed ratio of the automatic transmission in response to said resistance indicative signal unless said manual command indicative signal is generated; and means for shifting the automatic transmission to establish said target speed ratio.

6. In a vehicle including a brake, an engine with a throttle valve, an automatic power transmission drivingly connected to the engine, and driving wheels drivingly connected to the automatic power transmission;

means for detecting condition of the brake and for generating a brake indicative signal when the brake is applied;

means for detecting a running average of a throttle opening degree of the throttle valve and for generating a parameter indicative signal;

means for generating an acceleration indicative signal indicative of an acceleration to which the vehicle is subject;

means for correlating said parameter indicative signal with said acceleration indicative signal to deduce a magnitude of a resistance which the vehicle is subject to and for generating a resistance indicative signal indicative of said magnitude of said deduced resistance;

means for determining a target speed ratio of the automatic transmission in response to said resistance indicative signal and said brake indicative signal; and means for shifting the automatic transmission to establish said target speed ratio.

7. In a vehicle including an engine with a throttle valve, an automatic power transmission drivingly connected to the engine, and driving wheels drivingly connected to the automatic power transmission:

means for detecting a presence of a leading vehicle and for generating a leading vehicle indicative signal when said leading vehicle is present within a limit range;

means for detecting a running average of a throttle opening angle of the throttle valve and for generating a parameter indicative signal;

means for generating an acceleration indicative signal indicative of an acceleration to which the vehicle is subject;

means for correlating said parameter indicative signal with said acceleration indicative signal to deduce a magnitude of a resistance to which the vehicle is subject and for generating a resistance indicative signal indicative of said magnitude of said deduced resistance;

means for determining a target speed ratio of the automatic transmission in response to said resistance indicative signal and said leading vehicle indicative signal; and means for shifting the automatic transmission to establish said target speed ratio.

8. In a vehicle including an engine with a throttle valve, an automatic power transmission drivingly connected to the engine, and driving wheels drivingly connected to the automatic power transmission:

means for detecting a running average of a throttle opening degree of the throttle valve and for generating a parameter indicative signal;

means for generating an acceleration indicative signal indicative of an acceleration to which the vehicle is subject;

means for correlating said parameter indicative signal with said acceleration indicative signal to deduce a magnitude of a resistance to which the vehicle is subject and for generating a resistance indicative signal indicative of said magnitude of said deduced resistance;

means for generating an engine brake running command; and means responsive to said engine brake running command, for shifting the automatic transmission to brake the engine.

* * * * *